July 1, 1941.   C. R. PATON   2,247,732
MOTOR VEHICLE
Filed Sept. 23, 1938   2 Sheets-Sheet 1

INVENTOR.
Clyde R. Paton
BY
ATTORNEYS.

July 1, 1941.   C. R. PATON   2,247,732
MOTOR VEHICLE
Filed Sept. 23, 1938   2 Sheets-Sheet 2
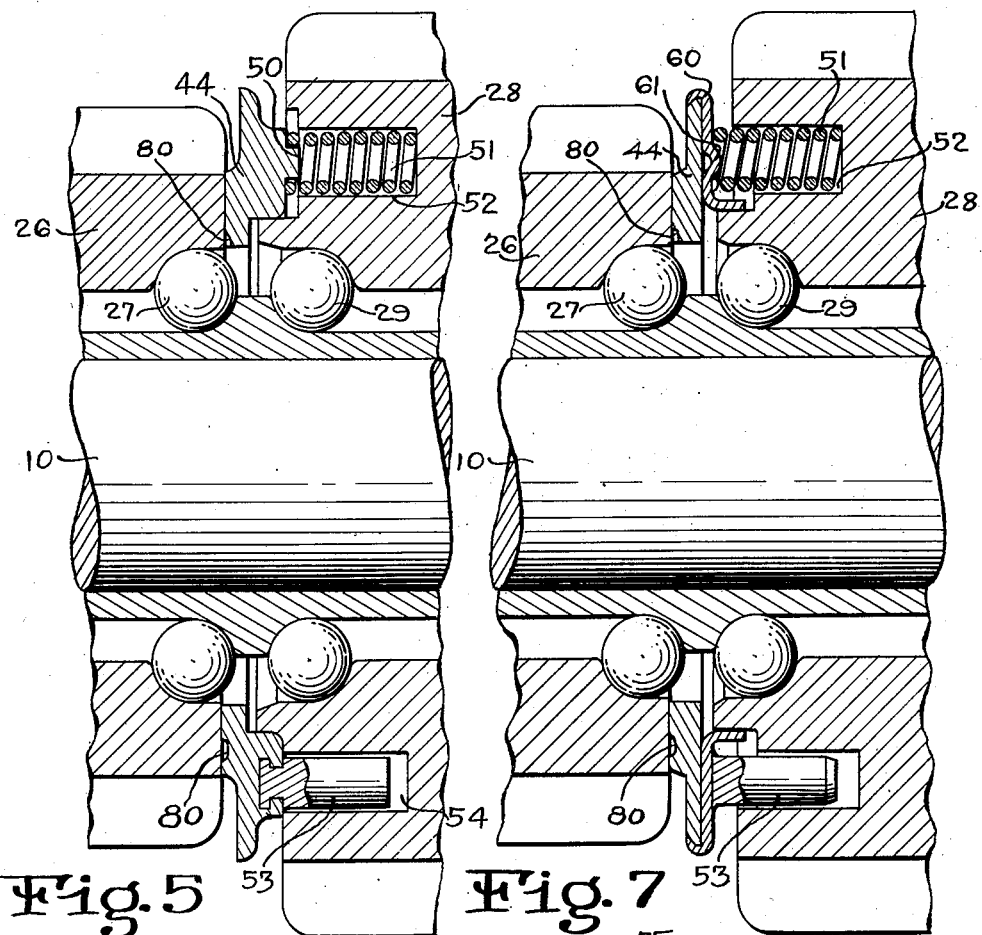
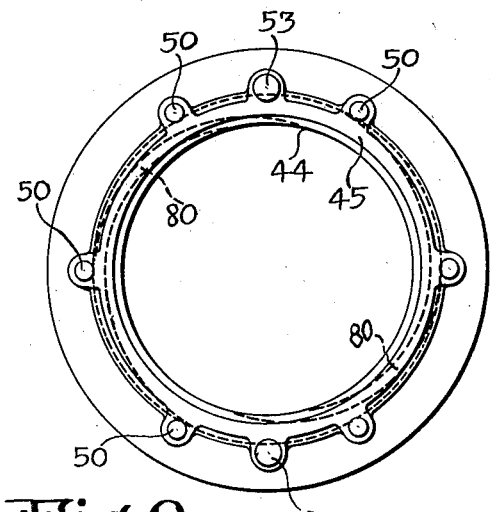
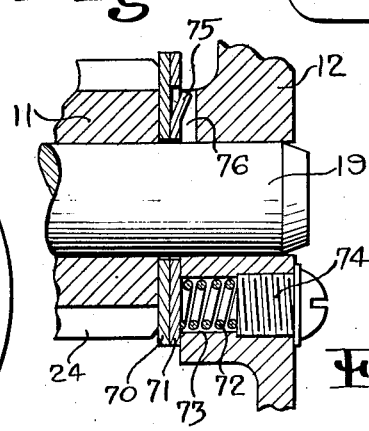
INVENTOR.
Clyde R. Paton
BY
ATTORNEYS.

Patented July 1, 1941

2,247,732

UNITED STATES PATENT OFFICE 2,247,732

MOTOR VEHICLE

Clyde R. Paton, Birmingham, Mich., assignor to Packard Motor Car Company, Detroit, Mich., a corporation of Michigan Application September 23, 1938, Serial No. 231,295

7 Claims. (Cl. 184—6)

This invention relates to power transmission mechanism and more particularly to change speed gearing employed with motor vehicles.

Transmissions for motor vehicles usually comprise aligned driving and driven shafts and a lay shaft in parallel relation with the driven shaft. The lay shaft is driven by the driving shaft by constant mesh gearing and loosely mounted gears on the driven shaft are in constant mesh with the lay shaft gears, the driving connections being established by suitable clutches. Changes in the angular velocity of the meshing gears resulting from varying engine operation or driving resistance cause their relative rotation as allowed by tooth clearance with the result that tooth impact noises are noticeable to occupants of the vehicle. Suitable damping or drag devices have been provided between adjacent gears in transmissions to prevent shifting of the teeth of meshing pairs of gears.

An object of the invention is to utilize such drag devices to force lubricant from the periphery of one of the loosely mounted gears in a transmission to the inner bearing thereof.

A further object of the invention is to provide a positive lubricating system for the bearings of loosely mounted gears in a constant mesh gear mechanism.

Another object of the invention is to provide a constant mesh gear mechanism with a device that serves both as a lubricant feeder for gear bearings and as a means for resisting the relative rotative movement of meshing gears normally allowed by tooth clearance.

Other objects of the invention will appear from the following description taken in connection with the drawings, which form a part of this specification, and in which:

Fig. 5 is a fragmentary sectional view of the transmission showing a modified form of oil feeding and tooth contacting device;

Fig. 6 is an elevational view of one end of the device shown in Fig. 5;

Fig. 7 is a view similar to Fig. 5, ilustrating a further modification of the oil feeding and tooth contact maintaining device;

Fig. 8 is a fragmentary sectional view of a further modification of the invention showing a tooth contact maintaining device associated with one end of the gear cluster on the lay shaft.

Figure 1:
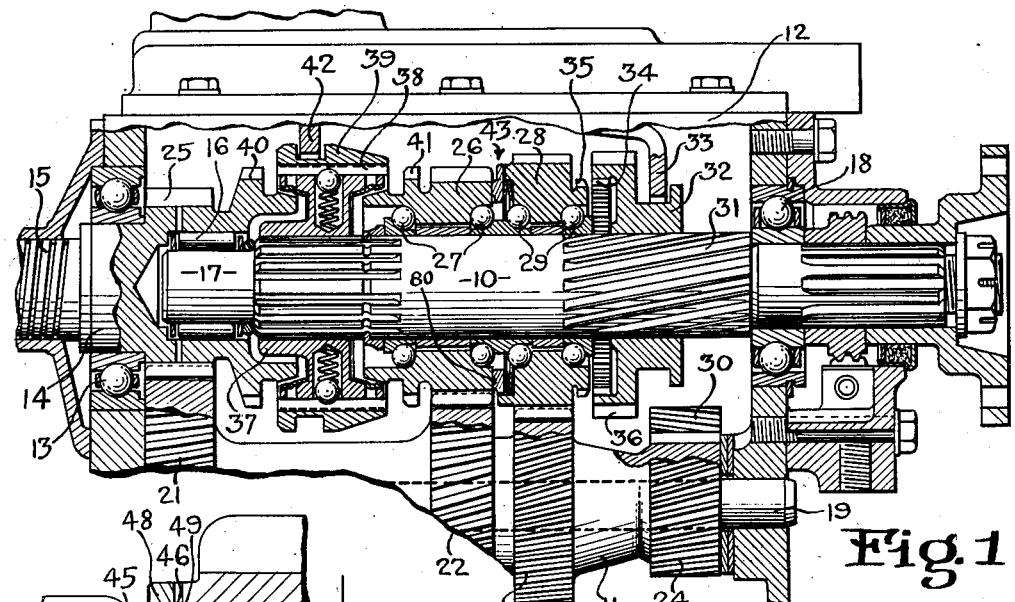
Fig. 1 is a view, partially in side elevation and partially in vertical section, of a motor vehicle transmission embodying the present invention.

Referring to the drawings, the invention is shown associated with a vehicle transmission having a splined driven shaft 10 and a gear cluster or gear spool 11 mounted in a housing or transmission casing 12. The front wall of the housing carries a suitable bearing 13 in which is mounted the enlarged rear end 14 of a driving shaft 15, which may be the vehicle clutch shaft, driven from the vehicle engine through conventional mechanism (not shown). The enlarged end of the driving shaft is formed with an axial recess for the reception of a bearing 16, in which the reduced forward end 17 of the driven shaft 10 is journaled. The rear end of shaft 10 is journaled in a bearing 18, seated in the rear wall of the housing 12, and is connected in the usual way to the propeller shaft to drive the vehicle wheels, this connection not being shown.

The gear cluster 11 is mounted to rotate upon an arbor 19 supported at its ends by the front and rear walls of the casing, and this gear cluster is formed with a number of integral gears 21, 22, 23 and 24. Of these, the gear 21 is in constant mesh with a gear or pinion 25, formed on the enlarged end 14 of driving shaft 15, so that the gear cluster or countershaft is continuously connected to and driven from the driving shaft. The gear 22 is also continuously in mesh with the gear 26 that is rotatably mounted on ball bearings 27 carried on the driven shaft.

Gears 23 and 24 constitute the low speed and reverse gears respectively. Gear 23 is in constant mesh with a gear 28 mounted on ball bearings 29 carried by the driven shaft 10, and in mesh with the gear 24 is the conventional idler 30. Shaft 10 is formed with helical splines 31 with which a clutch 32 engages in a driving relation. This clutch can be shifted axially of the drive shaft by means of a fork 33 operated in any conventional manner to engage the internal teeth 34 with clutch teeth 35 formed on the end of gear 28. The clutch can also be shifted so that the external teeth 36 will engage with the idler 30.

Thus, in the illustrated embodiment of the invention, clutch 34 may be moved to mesh with the clutch teeth 35 on gear 28 to provide a first speed drive through the transmission mechanism, or the clutch may be moved to engage the teeth 36 with the idler 30 to provide a reverse drive. Second speed drive through the transmission is obtained by connecting the constant mesh gear 26 to the shaft 10, and third or high speed drive through the transmission is obtained by coupling shafts 10 and 15, thus providing a direct drive.

To establish the second and high speed connections described, the forward portion of shaft 10 is provided with a clutch device which is slidably secured to the shaft between the gears 25 and 26. This clutch device has a hub portion 37 that engages in driving relation with and is slidably mounted on splines on the forward portion of shaft 10, and which has peripheral teeth 38 that engage with internal teeth of a slidable positive clutch member or ring 39. The internal teeth of this member 39 are arranged to engage either with clutch teeth 40 formed on the enlarged end of the driving shaft or with clutch teeth 41 formed on the gear member 26.

To effect the sliding or shifting movement of the clutch ring, there is provided a groove in which shifter fork 42 is arranged to be actuated in any conventional manner. The ring 39 can thus be moved to mesh with the clutch teeth 40 or with the clutch teeth 41, and when engaged with the clutch teeth 40 the clutch device will provide a direct driving connection between the driving shaft 15 and the driven shaft 10, thereby establishing high speed driving connection. When the clutch ring engages the clutch teeth 41 on gear 26 then second speed driving connection is established between the driving shaft 15 and the driven shaft 10 through meshing gears 25 and 21, the gear cluster, and the constantly meshing gears 22 and 26. A conventional form of synchronizing means is shown associated with the clutch device and the adjacent portions of gears 25 and 26.

It will be observed that there are three pairs of constantly meshing gears by means of which the three forward speeds are established. It will also be noted that gears 25, 21, 22, and 23 are rotated positively with the driving shaft 15. Gears 26 and 28 are rotatably mounted and will run idly except when clutched to the driven shaft 10. The teeth of the pairs of meshing gears are formed in the usual manner with a suitable driving clearance.

The drive mechanism so far described has been found to have certain disadvantages. When the driving shaft 15 can oscillate, as in my Patent No. 2,099,703, of November 23, 1937, it will rock about the driven shaft and cause impacting of the meshing gear teeth. Changes in angular velocity of the driving and driven gear will likewise cause the meshing teeth of the pairs of gears to impact. These impacts are detrimental to the life of the transmission and create noises that have been found objectionable to occupants of the vehicle. In addition to this, it has been found difficult to lubricate the bearings for the rotatably mounted gears 26 and 28 where the lubricant is supplied by rotation of the gear cluster in a lubricant supply pool at the bottom of the transmission casing. This invention has for its main purpose the elimination of these objectionable defects in transmission mechanism of the character described.

Figure 2:
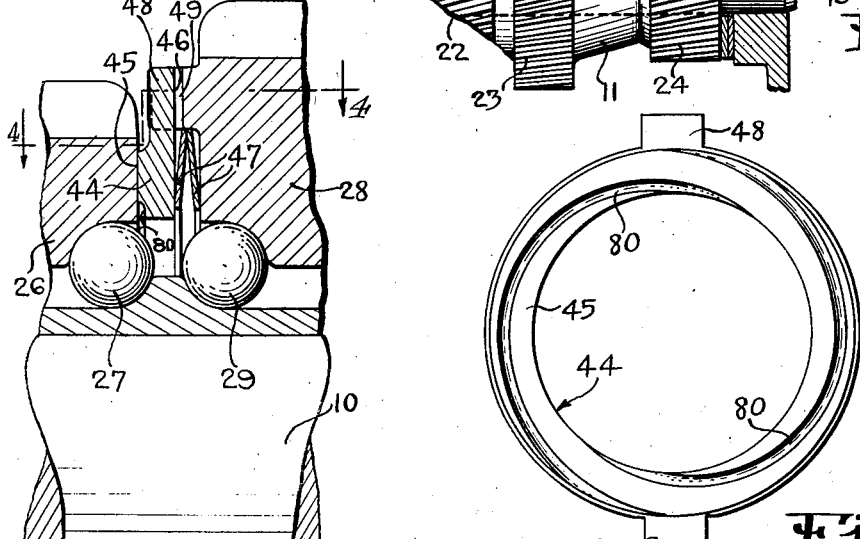
Fig. 2 is a fragmentary enlarged view of the device shown in Fig. 1 for maintaining the meshing teeth of adjacent pairs of gears in contact and for lubricating the gear bearings.
Figure 3:
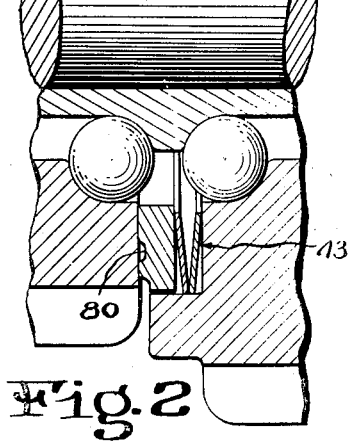
Fig. 3 is an elevational view of one end of the oil feeding and gear contact maintaining device.
Figure 4:
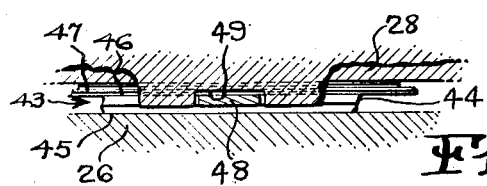
Fig. 4 is a sectional view taken on line 4—4 of Fig. 2.

It is proposed to restrict this relative rocking of meshing gears in a transmission by the employment of a drag or damping device. As one means of carrying out the invention, such a device, indicated generally at 43, is associated between gears 26 and 28. This device is also utilized to positively feed lubricant from the exterior of gears 26 and 28 to their interior bearings. In the preferred form of such device, as shown in Figs. 1 to 4 inclusive, there is a friction element 44, preferably in the shape of a ring formed of lubricated bronze, having a front face 45 and a rear face 46. The front face of the ring is formed to bear against the rear face of gear 26 and is held in such engaged relation by pressure means in the form of a pair of resilient metal disks 47. These disks are reversely bowed and arranged so that one of them engages the rear face 46 of the ring member 44 and the other engages against a forward wall of gear 28. The friction ring is also preferably arranged to be rotated with one of the gears and for this purpose the ring is provided with oppositely disposed ears 48 that engage in grooves 49 formed in the forward wall of gear 28, the ring partially telescoping into such forward end of the gear. The interengaging relation of the ears and grooves provides a positive driving relation between the ring member 44 and gear 28.

Gears 26 and 28 are driven from the gear cluster at different speeds when the driving shaft is operating, and the device 43 will rotate positively with the slower speed gear and will frictionally engage the faster gear 26 due to the pressure means 47. Because of such drag or damping device, the opposite faces of the teeth on gears 26 and 28 will engage the gear teeth with which they mesh, that is when shaft 15 is driving, engagement of the teeth on gears 22 and 23 will be on the leading sides and engagement of the teeth on gears 23 and 28 will be on the following side. Thus changes in the angular velocity of the driving and driven shaft or relative rocking of such shafts will be resisted. This drag effect of the device 43 not only applies to the first and second speed gears but also to all of the meshing gears. The impact of meshing gear teeth as previously permitted is thus substantially eliminated for all normal operating conditions.

In the modified form of the invention shown in Figs. 5 and 6, the friction ring 44 is held in operating position with the gears 26 and 28 by a different form of securing and pressure means. In this instance the ring is of greater radial dimension and the rear face is formed with a plurality of bosses 50 serving to pilot one end of coil springs 51 that are mounted in recesses 52 in the gear 28. The rear face of the friction ring has fixed thereon a pair of oppositely disposed pins 53 that project into recesses 54 in the gear 28 to provide a driving connection between the gear and the friction ring.

In the form of the invention shown in Fig. 7, instead of having the bosses and the pins integral with the friction ring 44 as in Fig. 5, there is a sheet metal cap 60 on the rear face of the ring that is suitably secured over the periphery thereof. This cap is formed with bosses 61 that serve to pilot the coil springs 51 that seat in recesses 52 in the gear 28. The pins 53 in this instance instead of being fixed to the friction ring 44, as in Figs. 5 and 6, are fixed to the cap 60 by welding or other suitable means. The devices shown in Figs. 5, 6 and 7 inclusive, are arranged in substantially the same relation to gears 26 and 28 as in the preferred form of the invention and they function in the same manner to damp relative rotation of the meshing gears.

In the form of the invention shown in Fig. 8, the drag device is somewhat different than heretofore described devices but the general effect produced thereby is similar. In this instance the device is applied to the gear cluster 11 and comprises a pair of friction ring members 70 and 71 that encircles the arbor 19 adjacent the rear wall of the transmission casing. The pressure means in this instance consists of a series of coil springs 72 that are arranged in recesses 73 formed in the rear wall of the transmission casing adjacent the arbor 19 and are seated at one end against plugs 74 that are screwed into the recesses. The other ends of the coil springs, that is the forward ends, bear against the friction ring 71 which in turn holds the friction ring 70 in engagement with the rear end of the gear cluster 11. The ring 71 has ears 75 struck therefrom that engage in notches 76 formed in the inside face of the rear wall of the transmission casing and this association of the ears 75 in the notches 76 will prevent rotation of the ring member 71. As the transmission casing is stationary and the ring 71 is locked against rotation, and as the coil springs 72 hold the rings 70 and 71 in frictional engagement and the ring 70 in frictional engagement with the gear cluster, a drag will be placed on the gear cluster that will serve to hold the meshing teeth of the gears on the cluster in contact with the teeth of the associated gears when driving conditions tend to separate the same.

The devices herein described will eliminate noises in the gears ordinarily emanating from torque variances and other causes tending to produce a relative rotational movement of the meshing gears that would cause an impact of the engaged teeth. As a consequence, transmissions employing the devices herein described will run quietly and the life of the parts will be increased.

The drag or damping devices shown in Figs. 1 to 7 inclusive, are also utilized as part of a lubricating system for the bearings of the rotatably mounted gears of the first and second speed trains. Ordinarily the gear cluster runs in oil and the gears carry oil to the gears above that mesh therewith, and while some of the oil so conveyed will find its way to the bearings of the upper gears, such lubrication for these bearings has not proved adequate.

The forward face 45 of the friction ring 44 is formed with spiral grooves 80 that terminate at the inner and outer peripheries of the ring. These grooves are covered when the friction member contacts the rear face of gear 26 and thus forms therewith passages through which oil will be positively fed from the exterior of the ring 44 to the interior thereof. As the teeth of the gears 22 and 26 come into engagement the oil elevated on the teeth of gear 22 will be squeezed out from the ends of the meshing teeth under pressure. In order to utilize this pressure to feed the lubricant to the bearings of gears 26 and 28, the peripheral forward portion of the friction element 44, in Figs. 1 to 7 inclusive, is arranged close to but spaced from the rear ends of the teeth of gear 26 to form a trough leading to the outer ends of grooves 80.

The devices herein described, with the exception of that shown in Fig. 8, serve both as a part of the bearing lubricating system, and to damp noises from the transmission ordinarily caused by impacts of the meshing teeth.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. A drive mechanism, having in combination two adjacent pairs of meshing gears, each pair having a drive gear and a loosely mounted driven gear, and a device mounted between the rotatably mounted gears operating to maintain the engaging teeth of the pairs of gears in contact and to feed lubricant from the exterior to the bearings of the loosely mounted gears.

2. A drive mechanism, having in combination two gear trains having upper loosely mounted driven gears and lower gears running in oil and at different speeds, a friction ring between the upper gears having grooves in one face bearing against one of such gears and anchor means drivingly engaging the other of such gears, and means holding the frictional engagement of said ring, the oil from the ring engaged gear being positively fed through the grooves to the interior of the gears by engagement with the ring and the frictional engaged gear in their relative rotation.

3. In a transmission mechanism, the combination of a pair of meshing gears having driving clearance for the teeth, one of said gears being loosely mounted, drag means frictionally engaging the loosely mounted gear and mounted to rotate at a different speed relative thereto, and an oil passage between the gear and the drag means leading from the exterior of the gear to the interior thereof, oil being positively fed through the passage by engagement with the gear.

4. In a transmission mechanism, a pair of meshing upper and lower gears, the lower gear running in oil and the oil adhering to said gear being squeezed from the ends thereof by the meshing teeth of the pair of gears, a friction member engaging one end of the upper gear and forming therewith a passageway from the exterior to the interior of the upper gear, means rotating said friction member at a different speed than that of the upper gear, and means adjacent the teeth at one end of the upper gear associated to direct oil leaving the end of the teeth into said passageway.

5. In a transmission mechanism, a pair of meshing upper and lower gears, the lower gear running in oil and the oil adhering to said gear being squeezed from the ends of the meshing teeth of the pair of gears, a friction member at one end of the upper gear having the inner portion thereof engaging against the end of the upper gear and formed with a spiral passage in its engaging portion, said friction member having a peripheral portion extending adjacent the ends of the teeth of the upper gear to form a guideway for directing oil leaving the ends of the gear to said spiral passageway, and means for driving said frictional member at a different speed than that at which the upper gear is rotated.

6. In a transmission mechanism, a first pair of meshing gears, a second pair of meshing gears rotating at different angular velocity than the first pair of gears, said pairs of gears consisting of upper and lower gears arranged in adjacent end-to-end relation, the lower gear of the first pair of gears running in oil and the oil adhering thereto being squeezed from the ends of the teeth by engagement with the upper gear, a friction member engaging one end of the upper gear of the first pair of gears and forming with the engaged gear and a spiral passageway leading from the exterior to the interior thereof, means fixing said friction member to rotate with the upper gear of the second pair of gears, and means extending from the end of the upper gear of said second pair of gears adjacent the ends of the teeth of the upper gear of the first pair of gears and forming a deflector for directing oil leaving the ends of the meshing teeth of the first pair of gears into said spiral passageway.

7. A drive mechanism, having in combination adjacent pairs of meshing gears, each pair having a drive gear and a rotatably mounted driven gear, and an oil feeding device intermediate and cooperating with the rotatably mounted gears, said device forcing oil therethrough from the exterior of one of the loosely mounted gears to the inner bearing portions of both loosely mounted gears.

CLYDE R. PATON.